Patented Aug. 7, 1945

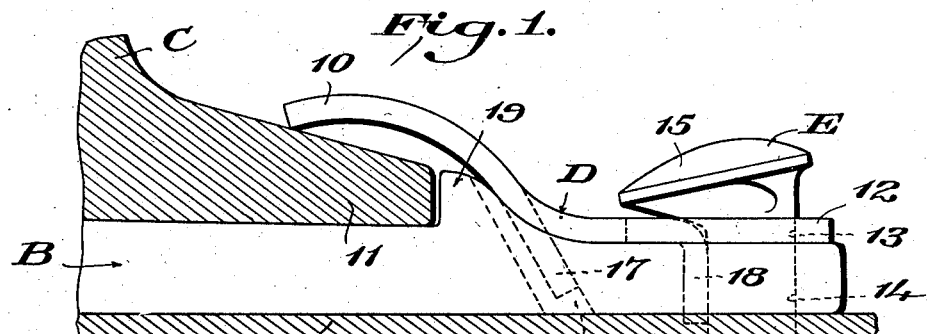
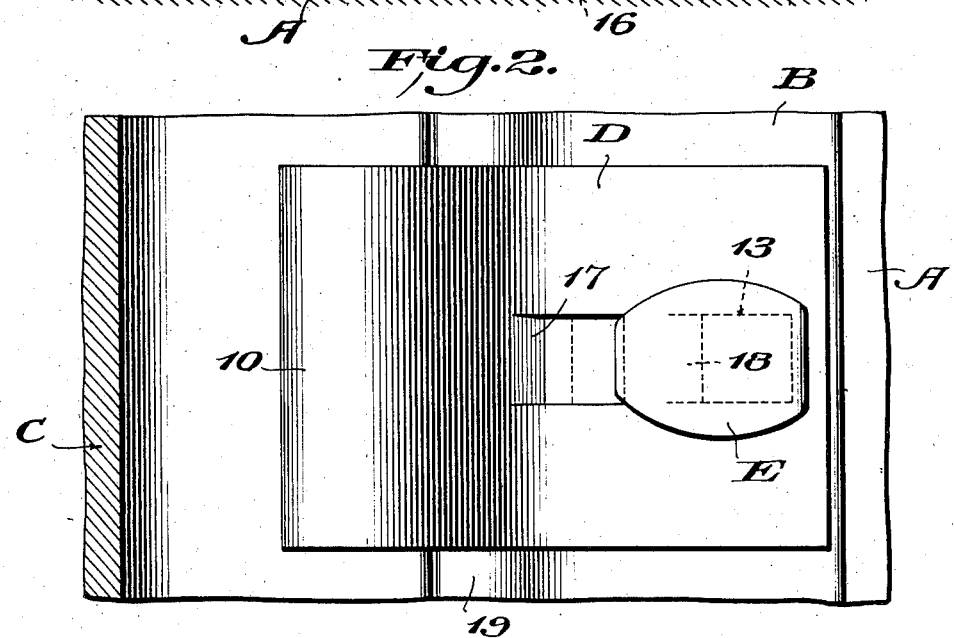
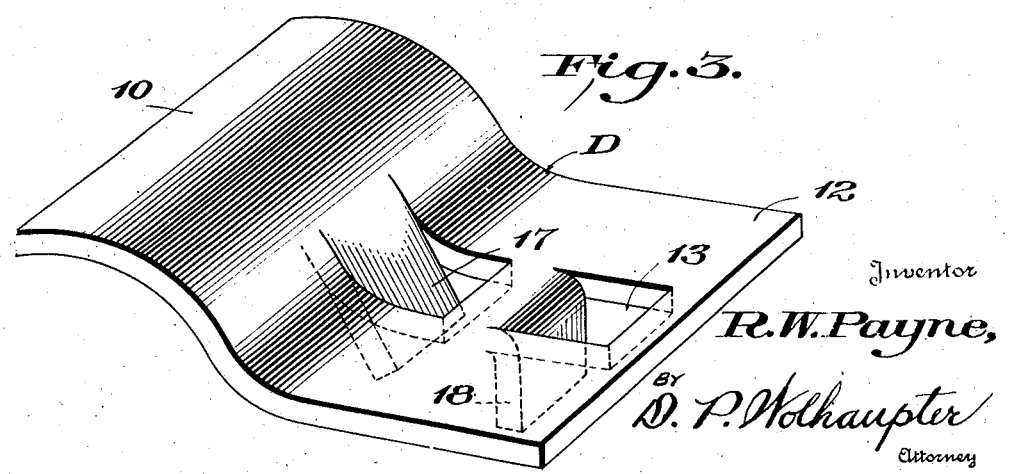

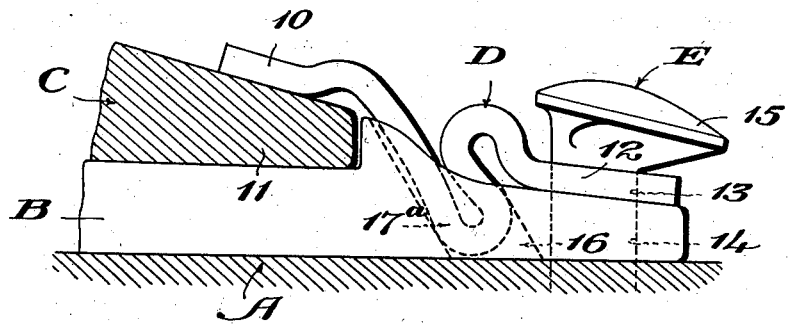
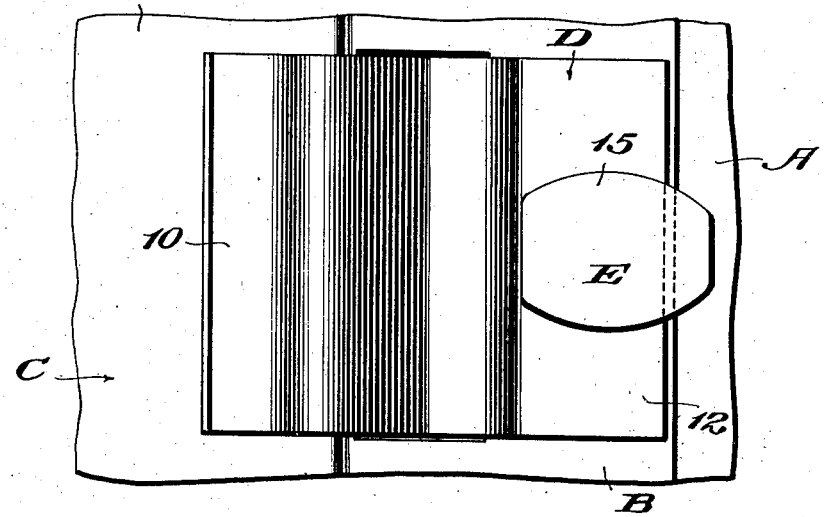
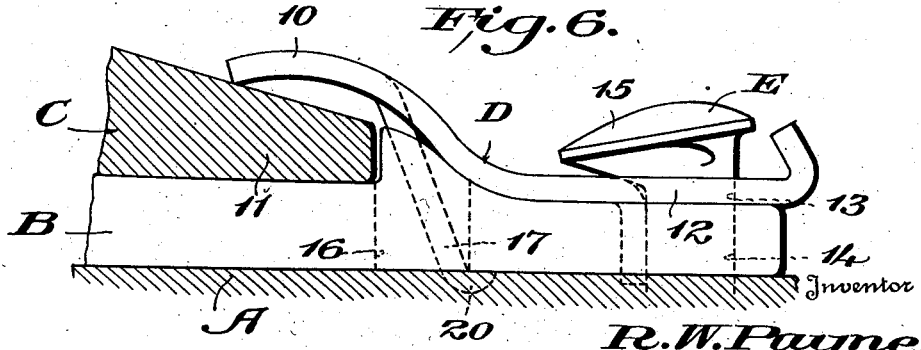

2,380,991

UNITED STATES PATENT OFFICE 2,380,991

RESILIENT RAIL FASTENER

Ralph W. Payne, Washington, D. C.

Application March 13, 1942, Serial No. 434,580

3 Claims. (Cl. 238—349)

This invention relates to rail fasteners of the type which are resilient to permit the rail to partake of the wave motion imparted to it by the passage of rolling stock thereover, and has particular reference to improvements in rail fasteners of this type which comprise a spring clip or plate anchored to a tie plate and having a resilient rail-holding arm portion overlying the rail flange.

One special object of the invention is to provide a rail fastener of the type mentioned which has a definite position relative to the tie plate and the rail when it is anchored to the tie plate and which, therefore, advantageously exerts a definite and predetermined holding force upon the rail. Another important advantage of the invention in this respect is that all of a plurality of the fasteners employed to fasten any given rail exert equal, or approximately equal, holding forces upon the rail.

Another special object of the invention is to provide a rail fastener of the type mentioned embodying a tie plate and clip combination according to which the clip and the tie plate are interengaged and the clip is spike-fastened to the tie plate in a manner such that the clip is effectively secured in a definite, operative position relative to the tie plate and the rail and the spike is not subjected to loosening forces as a result of forces imposed upwardly upon the clip by the rail.

Another special object of the invention is to provide a rail fastener of the type mentioned which is of simple construction, easy to produce, of low production cost, easy to install, of low maintenance cost, and which is thoroughly reliable and efficient in service.

With the foregoing and other objects in view, which will become more fully apparent as the nature of the invention is better understood, the same consists in a resilient rail fastener embodying the novel features of construction, combination and arrangement of parts as will be hereinafter more fully described, illustrated in the accompanying drawings and defined in the appended claims.

In the accompanying drawings, wherein like characters of reference denote corresponding parts in related views:

Figure 1 is a cross sectional view through a portion of a cross tie, and rail, illustrating a rail fastener formed in accordance with one practical embodiment of the invention and operatively applied to the tie plate.

Figure 2 is a top plan view of the structure shown in Fig. 1.

Figure 3 is a perspective view of the clip shown in Figs. 1 and 2.

Figure 4 is a view similar to Fig. 1 illustrating an alternative embodiment of the invention.

Figure 5 is a top plan view of the structure shown in Fig. 4; and

Figure 6 is a view similar to Fig. 1 illustrating another alternative embodiment of the invention.

According to each of the different embodiments of the invention illustrated in the drawings, A designates a portion of a cross tie; B designates a portion of a tie plate supported upon the cross tie A; C designates a portion of a rail seated upon the tie plate B; D designates a rail fastening clip seated upon the top of the tie plate B, and E designates a spike extending through spike holes in the clip D and the tie plate B and serving to fasten said clip upon said tie plate and also to fasten said tie plate upon the cross tie A.

Further in accordance with each of the illustrated embodiments of the invention, the clip D is in the form of a plate of resilient sheet material, such as spring steel, including an inner end portion 10 overlying the rail flange 11 and an outer flat end portion 12 seated flatly upon the top of the tie plate B outwardly from the rail flange 11; the said flat outer end portion 12 is provided with a spike hole 13 alined with a spike hole 14 in the tie plate B; the spike E extends through said spike holes into the tie A and its head 15 engages the top of the portion 12 of the clip D and thereby fastens said clip against the tie plate and the latter against the tie; the tie plate is provided, between the spike E and the adjacent edge of the rail flange 11, with an opening 16, and the clip D is provided with a downwardly extending tongue 17 engaged in said opening 16.

According to the specific embodiment of the invention illustrated in Figs. 1 to 3, the opening 16 in the tie plate B is inclined downwardly and outwardly and the tongue 17 of the clip D is an integral part of said clip struck therefrom and extends downwardly and outwardly relative thereto at the same, or approximately the same, inclination as the opening 16. Moreover, said tongue 17 is located relative to the clip D so as to engage the wall defining the outer side of the opening 16 when said clip D is operatively positioned upon the tie plate B. Accordingly, when the spike E is driven to fasten the outer end portion of the clip D upon the tie plate B and the latter upon the cross tie A, the tongue 17 coacts with the wall defining the outer side of the opening 16 to hold that portion of the clip D which is disposed between the spike E and the rail flange 11 against upward movement relative to the tie plate B. Therefore, upward forces imposed on the inner end portion 10 of the clip D by the rail flange 11 are not transmitted to the spike E and there is little or no tendency of said spike to become loosened in consequence of the recurring upward forces imposed on the inner end portion 10 of the clip by the rail flange as the rail partakes of its natural wave motion in service.

Preferably the spike hole 13 in the clip D is formed by striking downwardly from said clip a tongue 18 to enter the spike hole 14 in the tie plate B and to bear against the wall defining the inner side of said spike hole 14. Moreover, the tongue 17 preferably is of approximately the same width as the opening 16 and the tongue 18 preferably is of approximately the same width as the spike hole 14. Therefore, said tongues cooperate with the tie plate B to operatively position the clip D relative to the plate and the rail flange and to hold said clip effectively against inward, outward or sidewise movement from its operative position. However, the tongue 18 is not essential and may be eliminated, if desired, as the spike E may be depended upon to serve the purposes of said tongue 18.

Preferably the medial portion of the clip D is curved to conform to and to lie snugly against the curved outer side of the usual upstanding rail engaging shoulder or rib 19 on the top of the tie plate B against which the edge of the rail flange 11 abuts, and preferably, too the inner end portion 10 of said clip D is arched to better withstand fatigue incident to its recurring upward and downward flexure and also to have biting engagement at its inner end with the rail flange the better to resist creeping of the rail.

The inner end portion 10 of the clip D may be either normally in contact with the rail flange 11 and under any desired normal load, or it may normally be spaced any desired distance above said rail flange so as to act to resist upward movement of the rail only after a predetermined amount of upward movement of the rail has occurred. In any event, since the clip has a definite normal operative position relative to the plate and the rail, its normal rail holding effect is definite and predetermined. Thus, all of any given number of the clips employed to fasten any given rail advantageously exert equal, or approximately equal, holding effects upon the rail.

Referring now particularly to the specific embodiment of the invention illustrated in Figs. 4 and 5 of the drawings, it will be observed that the clip D is bent upon itself to provide the downwardly and outwardly inclined tongue 17ª. In this modification, the tongue 17ª, as shown, is formed by doubling or folding the clip plate upon itself with the result of producing what may be termed a spring loop which is downwardly and outwardly inclined from the bottom of the plate, is driven or forced into the downwardly and outwardly inclined opening 16 substantially fills that opening, and has a definite bearing against the outer and inner walls thereof. This construction is considered a desirable and practical form of the invention, inasmuch as the upward movement of the inner spring arm 10 of the clip is restrained by the spring loop and at the same time exerts outward pressure against the outer member of the loop, which in turn presses against the outer wall of the opening 16. Thus, the spring loop, constituting the tongue 17ª in this form of the invention, acts as a holding member, independent of the outer arm 12 and the spike E, to resist tendency of the spring clip to be lifted out of operative position under the recurring up and down movements of the rail. In other respects the clip may be of the same general design and may cooperate with the tie plate and the rail in the same general manner as the clip shown in Figs. 1 to 3. It will be noted, however, that the clip of the Figs. 4 and 5 embodiment of the invention is devoid of a tongue such as the tongue 18 of the Figs. 1 to 3 construction and that the inner end portion 10 of the clip is formed to lie flatly against the upper face of the rail flange 11.

Referring particularly to the specific embodiment of the invention illustrated in Fig. 6 of the drawings, the construction is generally the same as the Figs. 1 to 3 construction, except that the tongue 17 is located to extend downwardly through a usual spike hole 16 in the tie plate B and is provided at its lower end with a nib 20 to underlie the tie plate adjacent to the outer side of said spike hole, thereby to hold the medial portion of the clip against upward movement relative to the tie plate.

The Figs. 4 and 5 and the Fig. 6 constructions obviously have the same general mode of operation and possess the same advantages as the Figs. 1 to 3 construction.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. Rail fastening means comprising a tie plate having a spike hole therein, a rail seated upon said tie plate, a resilient clip of spring steel sheet material having its outer end portion seated upon the top of said tie plate and provided with a spike hole, a spike extending through said spike holes and fastening said outer end portion of said clip firmly upon the top of said tie plate against upward movement relative thereto, the inner end portion of said clip being free and resilient and overlying the rail flange to resiliently resist upward movement of the rail relative to the tie plate, said plate having therein an opening spaced inwardly from its spike hole, and said clip having a tongue-like portion depending therefrom at a point spaced inwardly from the spike hole therein and extending into said opening and cooperating with the portion of the tie plate at the outer side of said opening to interlock the clip with the tie plate at a point spaced inwardly from the spike and outwardly from the edge of the rail flange against upward movement relative to the tie plate, whereby flexure of the clip by upward movement of the rail flange is confined to the said free resilient inner end portion of the clip and the clip is prevented from imposing upwardly directed loosening forces upon the spike.

2. Rail fastening means comprising a tie plate having a spike hole therein, a rail seated upon said tie plate, a resilient clip of spring steel sheet material having its outer end portion seated upon the top of said tie plate and provided with a spike hole, a spike extending through said spike holes and fastening said outer end portion of said clip firmly upon the top of said tie plate against upward movement relative thereto, the inner end portion of said clip being free and resilient and overlying the rail flange to resiliently resist upward movement of the rail relative to the tie plate, said tie plate having therein an opening spaced inwardly from its spike hole, the wall defining the outer side of said opening being inclined downwardly and outwardly, and said clip having a tongue-like portion depending therefrom at a point spaced inwardly from the spike hole therein and extending downwardly and outwardly into said opening and bearing against said wall and thereby interlocking the clip at a point spaced inwardly from the spike and outwardly from the edge of the rail flange against upward movement relative to the tie plate, whereby flexure of the clip by upward movement of the rail flange is confined to the said free resilient inner end portion of the clip and the clip is prevented from imposing upwardly directed loosening forces upon the spike.

3. Rail fastening means as set forth in claim 1 including a tongue extending downwardly from the clip into the spike hole in the tie plate and cooperating with said tie plate to hold the clip in a definite operative position relative to the tie plate and the rail.

RALPH W. PAYNE.